Dec. 26, 1967    G. D. SMITH ET AL    3,359,697
SUSPENDED CEILINGS
Filed March 5, 1964    6 Sheets-Sheet 1
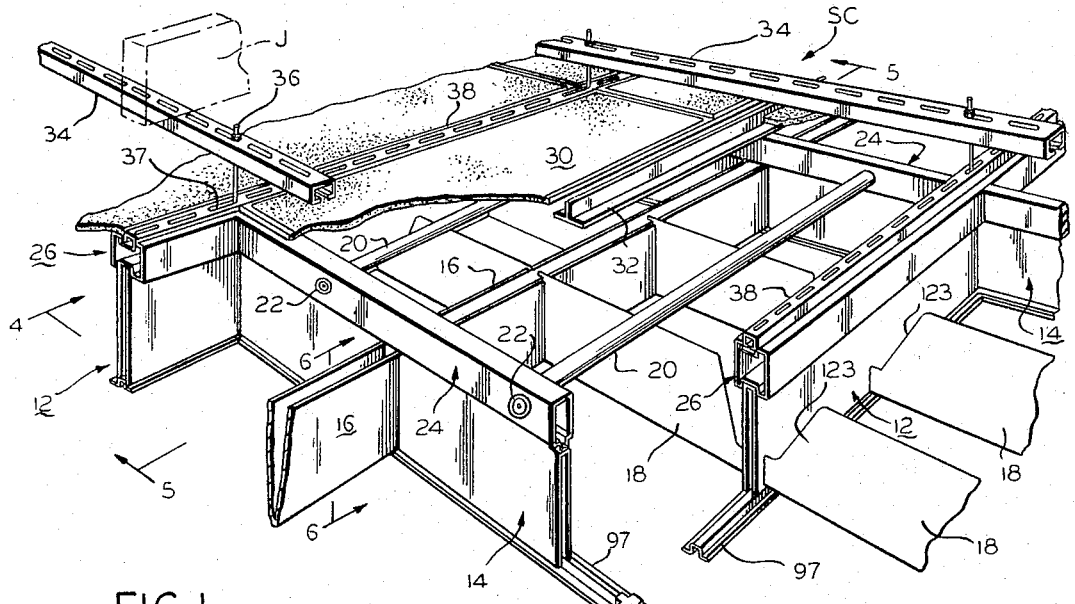
FIG. 1
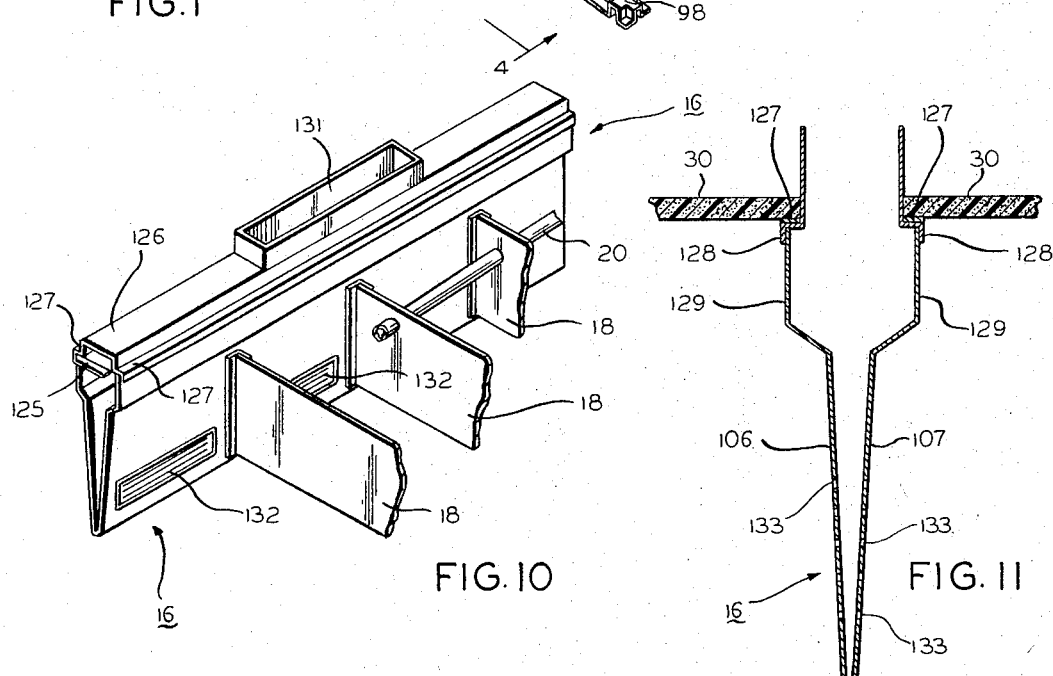
FIG. 10
FIG. 11
INVENTORS
WILLARD W. THOMPSON
GEAN D. SMITH
BY
*Lindberg*
ATTORNEY Dec. 26, 1967  G. D. SMITH ET AL  3,359,697
SUSPENDED CEILINGS Filed March 5, 1964  6 Sheets-Sheet 3

INVENTORS
WILLARD W. THOMPSON
GEAN D. SMITH
BY
*R. T. Lindberg*
ATTORNEY

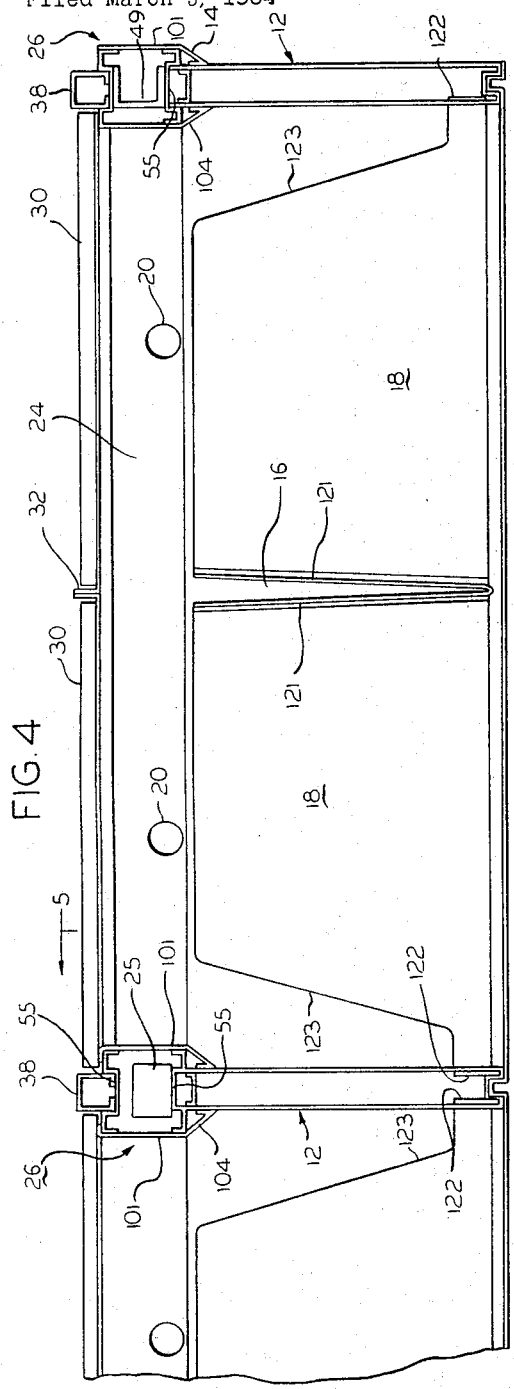
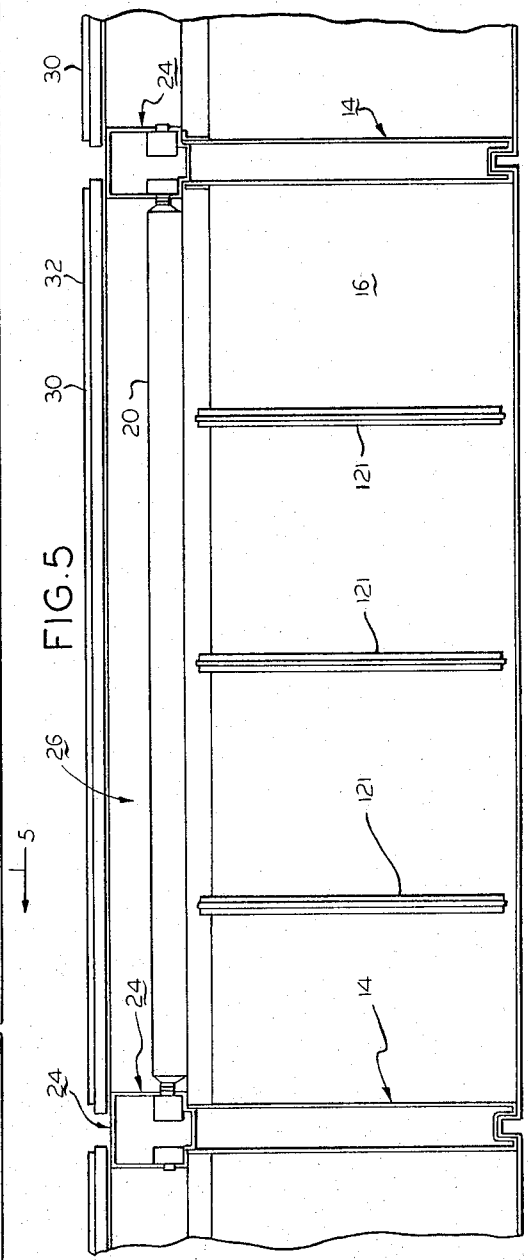

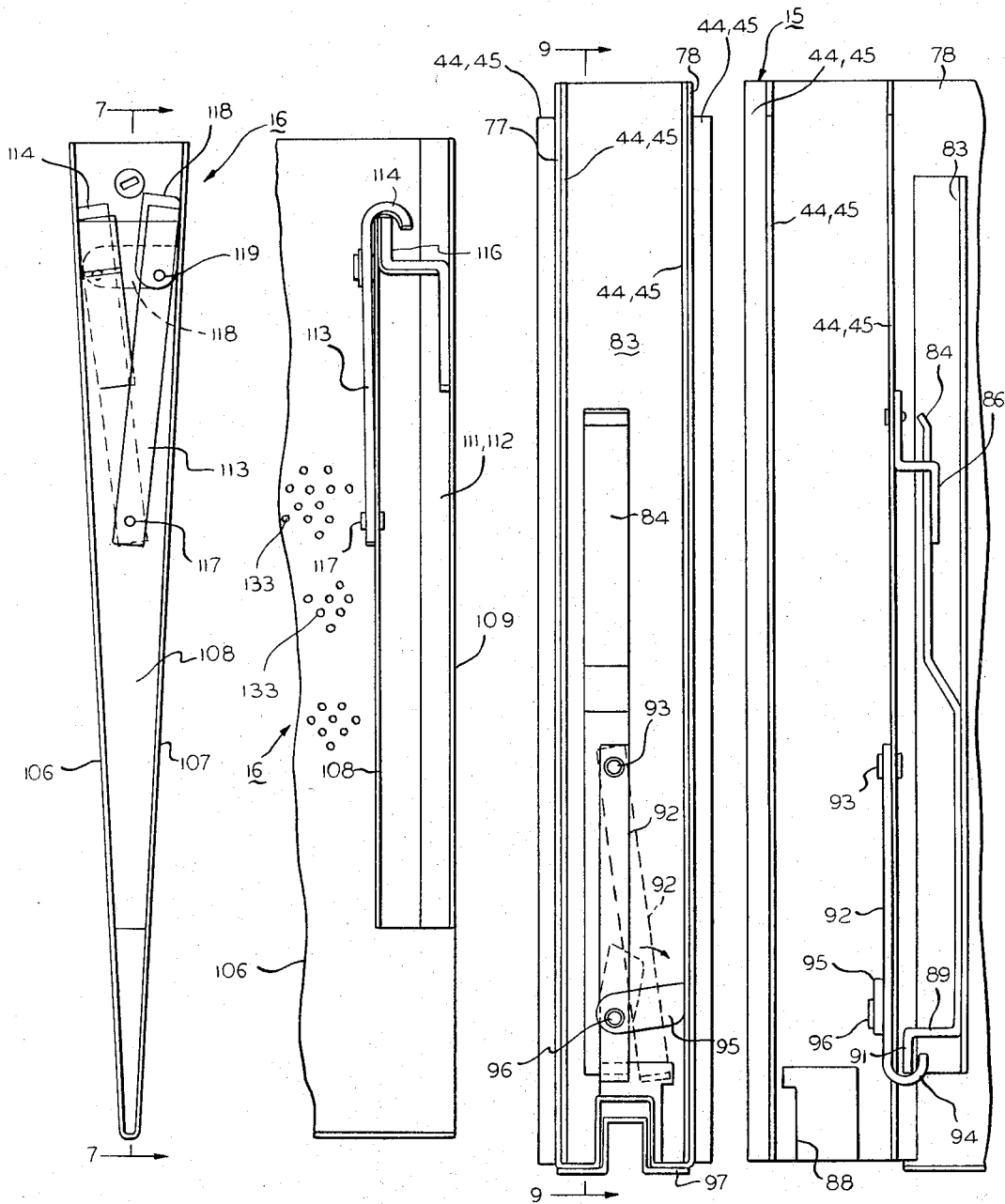

Dec. 26, 1967 G. D. SMITH ET AL 3,359,697
SUSPENDED CEILINGS
Filed March 5, 1964 6 Sheets-Sheet 6
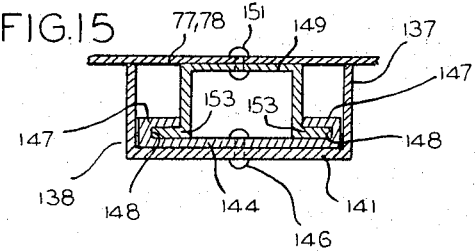
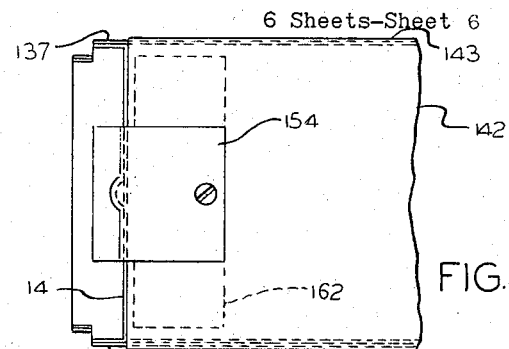
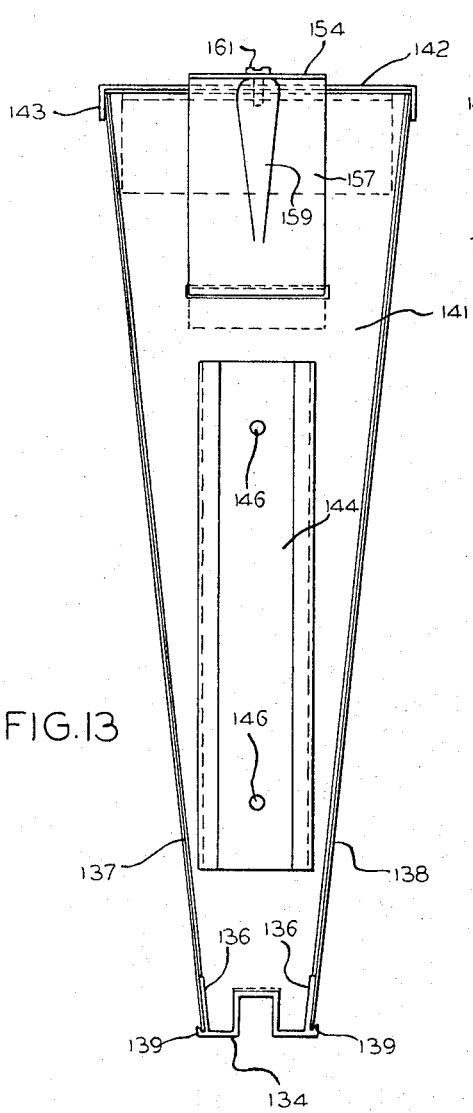
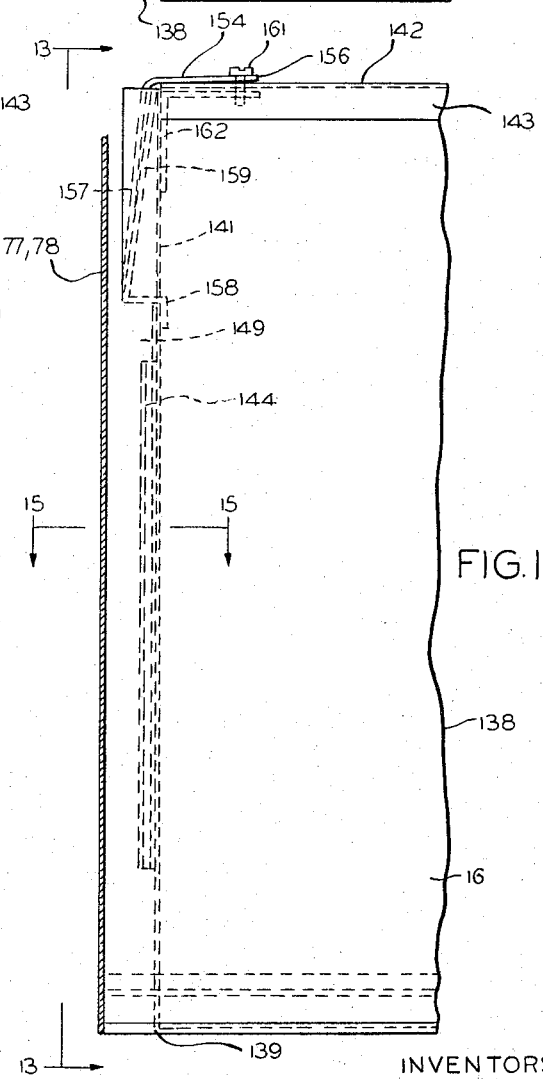
INVENTORS
WILLARD W. THOMPSON
GEAN D. SMITH
BY
ATTORNEY

United States Patent Office 3,359,697
Patented Dec. 26, 1967

3,359,697
SUSPENDED CEILINGS
Gean D. Smith, Oak Lawn, Ill., and Willard W. Thompson, Milton, Mass., assignors to Luminous Ceilings, Inc., Chicago, Ill., a corporation of Illinois
Filed Mar. 5, 1964, Ser. No. 349,627
11 Claims. (Cl. 52—506)

This invention relates in general to a suspended ceiling construction of modular design, and more particularly to a suspended ceiling construction formed of modules having improved structure for the support and assembly thereof, at the same permitting ready replacement and disassembly, and at the same time being adapted to receive components of differing function in a typical module.

Suspended ceilings arranged to support lighting apparatus and to supply conditioned air are desirably made from modular elements, easily assembled at the site. It is desirable to provide components which may be assembled into a stable structure, and also permitting ready revision for replacement or alteration, and also providing proper light and conditioned air to the room below.

According to the present invention it is possible to construct a suspended ceiling made of selected modular elements arranged to provide the proper spacing of modular lighting elements as well as modular conditioned air supply and return elements, all these elements being secured together by a novel structure provided at the intersection of the modular elements to provide a rigid assembly which can readily be suspended from conventional overhead framing members. By the structure according to the invention it is possible to assemble the modular elements and lock the same releasably into position, at all times concealing the locking structure.

It is an object of the present invention to provide a suspended ceiling structure characterized by a modular construction having interchangeable modular elements adaptable for either or both lighting and the supply of conditioned air.

Another object is to provide an easily assembled suspended ceiling construction permitting ready access to the modular elements comprising the same.

Briefly, the objects of the present invention are accomplished by the provision of novel corner post assemblies suspended from overhead framing at spaced apart positions corresponding to the intersection of the modules. These corner post assemblies are constructed to connect with modular assemblies to conceal the manner of attachment. Light reflecting modular assemblies of substantially identical construction, and referred to as main and cross baffles, are adapted to be releasably engaged with the corner post assemblies for forming the boundaries of a typical module section. The modular assemblies in turn are adapted to support a matrix of light reflecting baffles. One of such modular assemblies may include a center support baffle releasably engaged at its ends between two opposite cross baffle modular assemblies, and employed for supplying conditioned air beneath the suspended ceiling assembly. Such center baffle is adapted to support one end of a group of intermediary light reflecting baffles which are releasably engaged between such center baffle and a main baffle assembly connected at its ends to a corner post. A relieved portion at one end of each subsidiary baffle permits the removal of an elongated fluorescent tube located thereabove, and supported at its ends at socket supporting and power supplying assemblies located thereabove and supported by the cross baffle modular assemblies, all without the removal of such intermediary light reflecting baffles.

Other objects and features of the present invention will become apparent on examination of the following specification, claims and drawings, wherein;

FIG. 1 is a general perspective view of suspended ceiling assembly formed of a matrix of modular assemblies connected at their ends to corner posts, said ceiling assembly embodying the principles of the present invention;

FIG. 4 is an elevational view of a cross baffle modular assembly looking substantially in the direction of the arrows 4—4 of FIG. 1;

FIG. 5 is an elevational view of a main baffle modular assembly looking in the direction of the arrows 5—5 of FIGS. 1 and 4, showing details of such modular assemblies;

FIG. 6 is a view of looking in the direction of the arrows 6—6 of FIG. 1, showing structure for securing a center support baffle at its ends to the cross baffle modular assembly;

FIG. 7 is a cross-sectional view showing structure for connecting the center baffle to the cross baffle, said view looking in the direction of the arrows 7—7 of FIG. 6;

FIG. 8 is an end view of a main and a cross baffle assembly showing structure at the ends of the baffle and the corner post for connecting the same to the corner post assembly;

FIG. 9 is a view taken along the line 9—9 of FIG. 8, looking in the direction of the arrows, and showing further details of the connection of the main or cross baffle to a corner post assembly;

FIG. 10 is a perspective view illustrating a center support baffle provided with a plenum connection to a plenum chamber;

FIG. 11 is a transverse section taken through the center support baffle of FIG. 10 and showing an alternate construction for directing air therefrom;

FIG. 12 is a side elevation view showing an alternate form of securing the center support baffle to a cross baffle;

FIG. 13 is an end view looking in the direction of the arrows 13—13 of FIG. 12;

FIG. 14 is a plan view of the baffle assembly seen in FIGS. 12 and 13; and

FIG. 15 is a section taken along the line 15—15 of FIG. 12 looking in the direction of the arrows.

Figure 2:
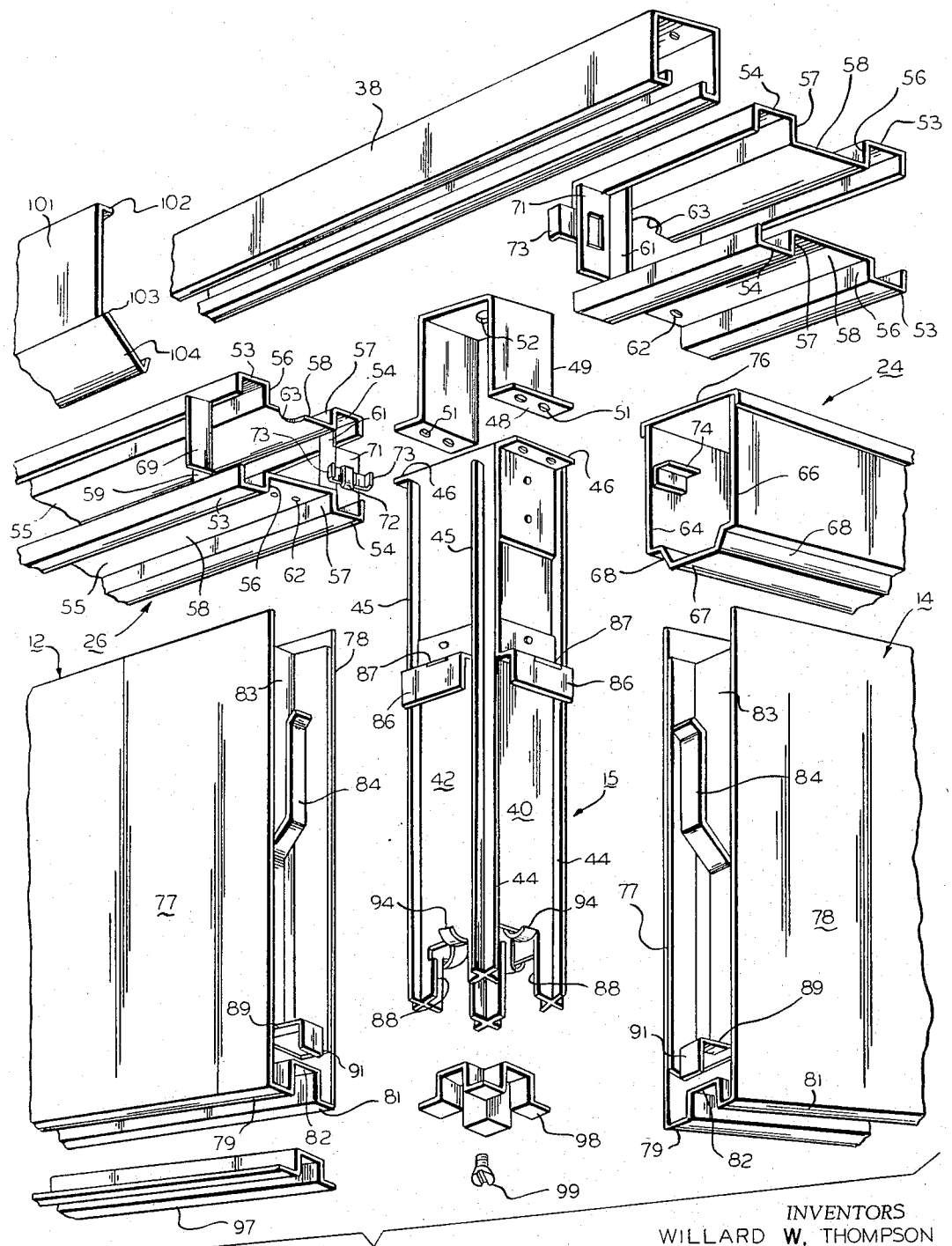
FIG. 2 is an exploded perspective view of a portion of the assembly seen in FIG. 1, showing the corner post assembly for securing the ends of the main and cross baffle modular assemblies.
Figure 3:
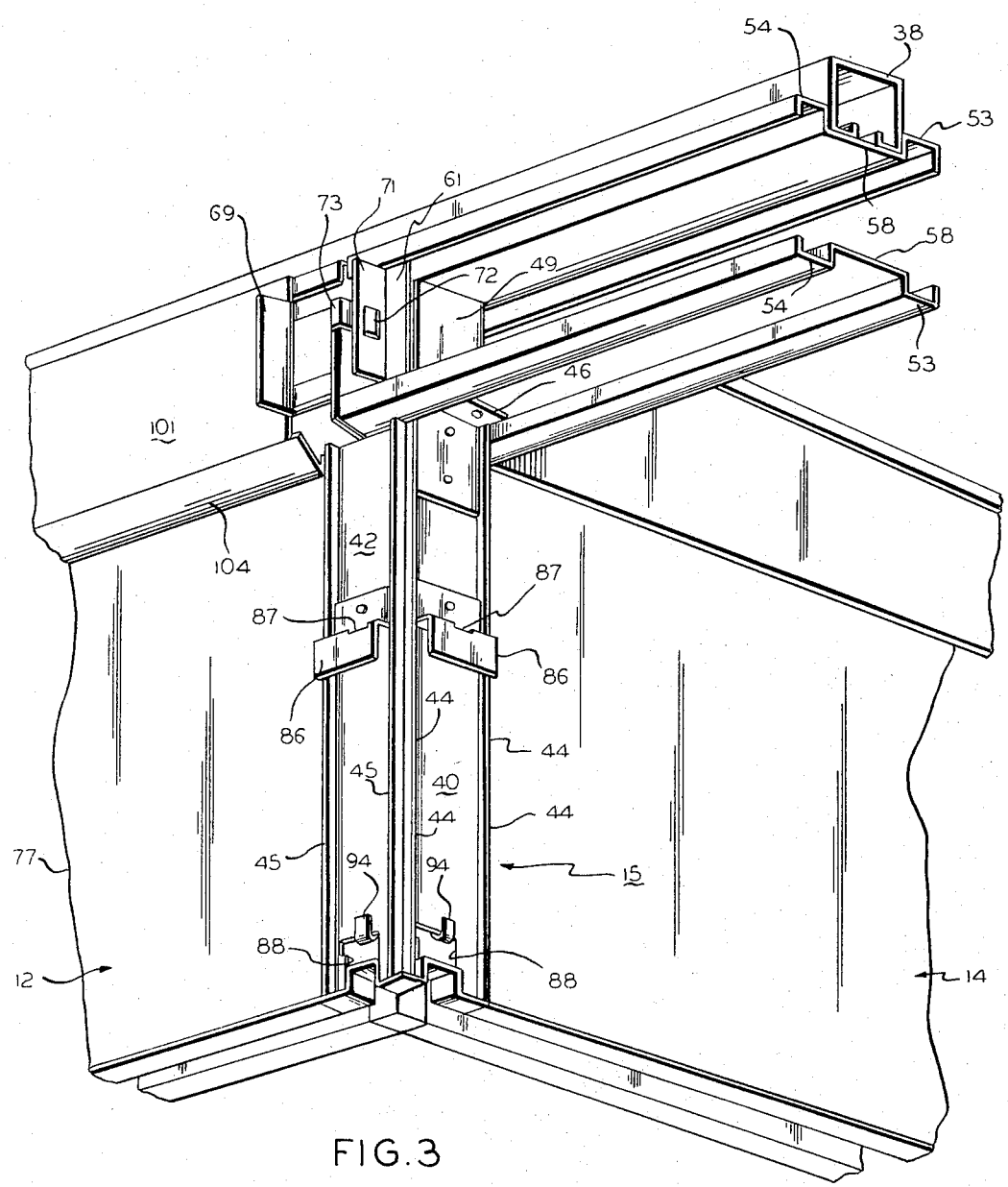
FIG. 3 is perspective view showing the modular assemblies of FIG. 2 in their assembled position at a corner post assembly.

Referring now particularly to FIG. 1 of the drawings, the improved suspended ceiling according to the present invention referred to generally by the letters SC, and there is portrayed in FIG. 1 a typical module of such improved ceiling. The module shown is contiguous to and integral with identical modules, and each module consists of parallel main baffle assemblies 12 defining side walls of a typical module, and parallel main cross baffle assemblies 14 defining the other side walls of a typical module. The baffle assemblies 12 and 14 are secured at their ends to a corner post assembly which is concealed from view in FIG. 1, and which is referred to by the reference numeral 15. Details of such corner post assembly are seen in FIGS. 2 and 3, and will be referred to later in this specification.

Each module includes a matrix of light reflecting center support baffles 16, and subsidiary light reflecting planar baffles 18. Center support baffles 16 are supported at their ends on the cross baffle assemblies 14, and the subsidiary light reflecting baffles 18 are supported at their ends on the main baffle assemblies 12 and the center support baffles 16. All of the baffle assemblies are for the purpose of reflecting and dispersing light supplied to the room below from a series of fluorescent tubes 20 located above the aforesaid baffles. The fluorescent tubes 20 are engaged between respective sockets 22 of a conventional type carried by socket channel assemblies 24 located above a main cross baffle assembly 14. Suitable electrical connections are extended to the tubes 20 by means of the socket channel assemblies 24, and such electrical connections include a conventional ballast indicated at 25 in FIG. 4. Ballasts 25 are located adjacent the juncture of alternate rows of main channel assemblies 26 disposed atop the main baffle assembly 12 and socket channel assembly 24 and as seen in FIGS. 2 and 3.

Acoustically absorbing and light reflective planar members 30 are supported by each module by means of the socket channel assemblies 24, the main channel assemblies 26, and a T-shaped channel member 32 extending parallel to the channel assemblies 26 and supported on the socket channel assemblies 24.

The suspended ceiling module SC seen in FIG. 1 is adapted to be suspended from overhead framing such as joists J. A plurality of framing members 34 in the form of slotted box sections are secured in any convenient fashion to the underside of the joists J. Framing members 34 have the webs thereof provided with spaced longitudinally extending apertures to receive a bolt 36, the lower end of which is connected to framing members 38 similar to framing members 34, but spaced therebelow. Bolts 36 are held at their lower ends to framing members 38 at apertures 37 in the web thereof. While bolt 36 is shown at the juncture of main baffle 12 and cross baffle 14 at a hidden corner post 15, the connection of lower framing 38 by bolt 36 to upper framing member need not be necessarily thereat.

As seen in FIG. 1 lower framing members 38 are nested within the main channel assemblies 26. Referring now to FIGS. 2 and 3, details of the corner post assemblies 15 are seen, and the mode of connection thereof to lower framing members 38. It should be remembered that the perspective showing in these figures is from a point of view ninety degrees (90°) from the point of view of FIG. 1.

Corner post assembly 15 seen in FIGS. 2 and 3 consists generally of a hollow rectangular cross section member having opposed pairs of walls 40 and 42 with edge flanges 44 extending from walls 40, and edge flanges 45 extending from walls 42. The upper end of the corner post assembly 15 has flanges 46 extending laterally from walls 40. Flanges 46 are in mating engagement with flanges 48 extending from an inverted stirrup 49, flanges 46 and 48 having complementary holes 51 through which securing bolts, not shown, are passed. The stirrup 49 has an aperture 52 for securing bolt, not shown, extending into the slot of lower framing member 38.

Main channel assembly 26 consists of lower and upper identical members 55, each of which comprises a pair of spaced channels 53 and 54 with their proximate inside faces 56 and 57 connected by a web 58. The identical members may be formed from a flat strip and bent along longitudinal lines to define the aforesaid spaced channels and connecting web. The two members 55 are maintained in proper spaced apart relationship by straps 59 and 61. The end of the lower web 58 has apertures 62 therein corresponding to the holes 51 in stirrup 49 and flanges 46 and 48, so that channel assembly may be held to corner post 15 and stirrup 49. The end of the upper web 58 has a relieved portion 63 aligned with aperture 52 for such joining.

It will be appreciated that the main channel assembly 26 extending to the right of the corner post assembly 15 seen in FIGS. 2 and 3 likewise consists of the same elements as the main channel assembly 26 extending to the left thereof. Such assembly extending to the right is marked with the same reference numerals, but the hand thereof is reversed for obvious reasons.

The two main channel assemblies are joined to the corner post assembly in the manner described, and the socket channel assemblies 24 are then joined to the corner post assembly 15.

The socket channel assemblies 24 are each preferably formed from a flat sheet of metal to define a pair of spaced side walls 64 and 66 which are joined by a lower web 67 including inclined side walls 68 spaced inward from the spaced side walls 64 and 66. Side wall 66 is guided to the corner post assembly 15 by a wing 69 extending laterally from strap 59 to main channel assembly 26. The other strap 61 of main channel assembly 26 has wing 71 supporting a locking member 72 having a pair of spaced latch fingers 73 adapted to straddle a latch 74 located on the inside of wall 64 of socket channel assembly 24. By reason of the resiliency of the side walls 64 and 66 they may be moved together sufficiently to cause latching engagement of latch 74 with latch fingers 73.

Socket channel assembly 24, as has been previously described, is for the purpose of supporting the fluorescent tubes 20, and the power leads thereto. Assembly 24 is closed along its upper margins by a closure member 76.

It may be noted that the main channel assembly 26 has the framing member 38 nested between the spaced channels 53 and 54 of assembly 26, which is seen more clearly in FIG. 3.

Thus there has been described an assembled structure comprising the corner post assembly 15, the main channel assembly 26 and the socket channel assembly 24.

Structure is provided for locking the main baffle 12 to the corner post assembly 15 in position beneath the main channel assembly 26, and for locking the cross baffle 14 beneath the socket channel assembly 24, all in such a fashion as to conceal the locking structure as well as the corner post assembly 15 very effectively. Such locking structure incorporated with the corner post assembly is identical for the main baffle 12 as well as the cross baffle 14.

The cross baffle 14 and the main baffle 12 are identical in cross section, and each is identically secured to the corner post assembly 15. Baffles 12 and 14 are each preferably formed from sheet metal in a metal brake to define spaced side walls 77 and 78. Alternately, the baffles may be formed with metal skins bonded on the inside to a honeycomb core made of any suitable material. These are upstanding from lowermost channel ribs 79 and 81 spaced by a horizontal and longitudinally extending web 82. Side walls 77 and 78 are stiffened and maintained in proper spaced relationship by web members 83 located near each end of the side walls 77 and 78.

The structure provided for holding the main baffle 12 and cross baffle 12 to the corner post assembly includes a locking clip 84, extending from the web 83 and spaced therefrom. Locking clip 84 cooperates with a locking finger 86 secured to the walls 40 and 42 of corner post assembly 15. Locking finger 86 has an aperture 87 therein through which the locking clip 84 extends, and finger 86 in the locking position bears against web 83 when locked.

Main baffle 12 and cross baffle 14 are adapted to be releasably locked to the corner post assembly 15, and to this end the lower ends of the walls 40 and 42 thereof are notched as at 88 for the reception of a lower locking catch 89 having a locking finger 91. A swivelable locking member 92 is pivotally supported at 93 on each of the walls 40 and 42 and terminates at its lower end in a hook 94, see FIGS. 8 and 9, engaged with the locking finger 91. This swivel member 92 is swung to the solid line position seen in FIG. 8 to a position of engagement with finger 91, and is locked in such position by a second locking finger 95 pivoted at 96 to the swivel member 92. Locking finger 94 bears against the inside of wall 40 or 42, as the case may be, in such locking position.

It may be noted that notch 88 is more than twice as wide as lower locking finger 91 and swivel member 92, so that disengagement may readily be had as desired. Locking up of the main baffle 12 and cross baffle 14 is achieved by a hooked tool for swinging swivel member 92 and locking finger 95 to locking position.

In the locked up position of the main baffle 12 the upper marginal portions of walls 77 and 78 thereof are nested between the channels 53 and 54 of main channel assembly 26. Likewise, in the locked up position of cross baffle 14 the upper marginal portions of the walls 77 and 78 thereof flank the lower inclined side walls 68 of the socket channel assembly 24.

The lower channeled extremities of the main baffle 12 and cross baffle 14 are "dressed" by a rail 97 which is pressed into place and held by channels 81 and 79. The ends of these rails 97 are "dressed" when they meet corner post assembly 15 by an end cap 98 held to rail 97 by a screw 99.

The sides of main channel assembly 26 are closed by a channel side cover 101 having an upper clamping limb 102 engaging the upper member 55 and a lower clamping limb 103 engaging lower member 55. An inclined depending side 104 extends from lower clamping limb 103 toward the sides of main baffle 12, see FIG. 2.

The center support baffle 16, see FIGS. 6 and 7, has diverging sides 106 and 107, and may be formed in a brake, or made of metal skins bonded to structural and insulating material such as honeycomb core made of styrene-foam or polyurethane foam. Sides 106 and 107 are joined near their ends by a web 108. The diverging sides 106 and 107 flank a positioning plate 109 secured to the sides of the cross baffle 14 in any convenient manner. Positioning plate 109 has protruding tabs 111 and 112 engaged with the inner faces of the sides 106 and 107.

Structure is provided for locking and supporting the center support baffle 16 to the cross baffle 14, and web 108 supports a swivel locking member 113 terminating at the upper end thereof in a hook 114 engaged with a lug 116 extending from positioning plate 109. Locking member 113 swivels upon a pin 117 supported by web 108, and member 113 is held in position by a swivel lock 118 pivoted at 119 to locking member 113.

Center support baffle 16 is adapted to support one end of subsidiary light reflecting baffles 18. The sides of support baffle 16 are accordingly provided with a reflecting baffle track 121 for one end of reflecting baffles 18, the other ends thereof being held in slots 122 in the main baffle 12, see FIG. 4. As seen in FIG. 4, one end of subsidiary baffles 18 is relieved as seen at 123 for ready removal and replacement of fluorescent tubes 20.

As seen in FIG. 1, the center support baffle is surmounted by a T-track 32 supported on the socket channel assembly 24, and a pair of these may be employed in side-by-side relationship if desired for warm air return. In many cases, however, the center support baffles 16 are employed for directing conditioned air to the space below suspended ceiling SC, and as seen in FIGS. 10 and 11, the baffle 16 has a cross section as shown to receive a plenum cap 126 formed with laterally extending flanges 127 supporting marginal portions of the acoustic material 30. Flanges 127 are continuous with downward extensions 128 which flank and embrace widened upper marginal portions 129 of support baffle 16. For support of the center support baffle 16 the ends thereof are provided with clip extensions 125 which rest upon the socket channel assembly 24. It may be noted that the widened upper marginal portions of center support baffle 129 have the top edges thereof lying in the same plane as the top of socket channel 24.

The plenum cap 126 has a duct receiving flange 131 which is connected to conditioned air duct work, not shown.

Where the center support baffle 16 is provided as a means for introducing conditioned air to the room enclosure, grill openings 132 are provided therein.

In lieu of the grill openings 132 in the sides of the center support baffle 16, the same may be provided with small aperture 133 as seen in FIGS. 7 and 11.

Referring now to FIGS. 12 to 15 inclusive, there is shown another mode of connecting the center support baffle 16 to the cross baffle 14. The center support baffle in this instance may have a bottom rail member 134 having laterally spaced side flanges 136 forming a bearing surface for side faces 137 and 138, these being held against flanges 136 by swages bearing thereagainst and extending from rail member 134.

The side faces 137 and 138 are secured to a web 141 at each end thereof, and the top of baffle 16 may be closed by the plenum cap 142 having depending longitudinal flanges 143 embracing the upper portions of side faces 137 and 138.

Structure is provided on the webs 141 for guiding the baffle 16 into position against cross baffle 14 which also has structure cooperating with the guide on baffle 16 for said purpose. Web 141 is accordingly provided with a track 144 held by rivets 146 to web 141. Track 144 has inturned side elements 147 to form a pair of laterally spaced guide grooves 148.

Track 144 cooperates with a "hat section" guide 149 held by rivets 151 to the side 77 or 78 of cross baffle 14 seen particularly in FIG. 1. "Hat section" guide 149 has laterally spaced rail elements 153 which are complementary to the grooves 148, as seen more clearly in FIG. 15.

A latching structure 154 is provided on the end of support baffle 16 and is arranged to cooperate with guide 149 to hold baffle 16 in position. Latching structure 154 has an horizontal limb 156 adapted to overlie plenum cap 142 and a depending latch member 157 terminating at its lower end in a finger 158 adapted to rest on the upper end of guide 149 when baffle 16 is in position. A spring finger 159 is sheared from latch member 157, and finger 159 urges latch member 157 outward as seen in FIG. 12 when latch structure is held in position by a locking screw 161 which is threaded into a locking bracket 162 welded to the inside of web 141.

When baffle 16 is first guided on the "hat section" guide 149, released screw 161 permits latching structure 154 to pass guide 149 until screw 161 is secured.

From the description foregoing it is believed evident that there has been provided some new and useful improvements in the art relating to suspended ceiling construction. The structures disclosed provide a stable structure readily suspended from overhead framing, and characterized by modular members which can readily be assembled and disassembled, and which when assembled effectively conceal the mode of assembly.

While the invention has been described in terms of a preferred embodiment thereof, the scope of the invention is not intended to be limited by the embodiment herein shown, but only by the terms of the claims here appended.

We claim:

1. A corner post assembly for use in a module of a suspended ceiling wherein said module comprises a plurality of spaced apart intersecting main and cross baffles, said corner post assembly being disposed at the intersection of said main and cross baffles and comprising a four walled structure, each of the walls of said structure having a pair of vertically arranged horizontally spaced outwardly extending flanges engaged between spaced wall members of said main and cross baffles, a swivelable locking element supported on each of said corner post walls, a locking element carried by each of said baffles and cooperating with a corresponding one of said swivelable locking elements to releasably lock the corresponding baffle to said corner post, first locking means carried intermediate the top and bottom ends of said each wall of said corner post assembly, and a second locking means carried on each of said baffles cooperating with said first locking means whereby said baffles are engaged with said corner post assembly, a flange adjacent to the top end of said corner post assembly, and a bracket suspended from a fixed support spaced above said corner post assembly and coupled to said top flange and said main channel assembly suspending said corner post assembly and said main channel assembly to said fixed support.

2. A corner post assembly according to claim 1 in which said swivelable locking elements are accessible through the bottom of said corner post assembly for rotation from the path of said locking elements whereby said locking elements on said baffle are permitted to pass said swivelable locking elements, said swivelable locking elements being thereinafter rotatable into the path of the locking elements on said baffles and engaged with said locking elements to prevent the disengagement of the baffles from the corner posts.

3. A corner post assembly according to claim 2, in which a locking member on each swivelable locking element is swung with respect to said swivelable locking element into engagement with an adjacent wall of said structure for preventing unintended movement of said swivelable locking element.

4. In a corner post and baffle construction for a suspended ceiling, said corner post being arranged to hold in locking engagement thereto baffles extending at right angles with respect to each other, said corner post comprising an elongated hollow walled member of rectangular cross-section, each of the outer faces of the walls of said hollow member being provided with longitudinally extending horizontally spaced flanges, said baffles having spaced sides for flanking and embracing said flanges when said baffles are brought into abutting relationship to said hollow member, a web connecting the spaced sides of each of said baffles at the ends thereof including a securing clip supported by said web, cooperating securing means disposed between the flanges of said hollow member, and engageable with a correlative securing clip, and means for locking each of said baffles to said corner post comprising a member retained within said hollow member and mounted for swiveling movement with respect thereto, a lower locking member at each end of said baffles, and a locking element secured to the lower end of said swivelable member in locking engagement with said lower locking member.

5. A corner post and baffle construction according to claim 4 wherein said swivelable member is provided with a member movable into engagement with the inside face of said hollow member to hold said swivelable member against movement.

6. In a corner post and baffle construction for a suspended ceiling, said corner post having said baffles extending therefrom at right angles with respect to each other, each of said baffles having spaced sides and secured to said corner post, said corner post comprising an elongated hollow walled member of rectangular cross-section, said walled member having flanges extending therefrom embraced by the spaced sides of said baffles, a web connecting the spaced sides of each of said baffles near each end thereof, a securing clip supported by said web, with cooperating securing means disposed between the flanges of said hollow member and engageable with said securing clip, and means for locking said baffle to said corner post comprising a locking member secured to said hollow member and mounted for swiveling movement with respect thereto, a lower locking member disposed on the web of said baffle, and a locking element secured to the lower end of said swivelable member in locking engagement with said lower locking member on the web of said baffle.

7. In suspended ceiling construction comprised of main and cross baffles connected to a corner post assembly, intersecting spaced planar sided baffles connected across parallel of such baffles, a locking connection for connecting said last named baffles to such parallel baffles comprising a guide supported on the planar sides of said parallel baffles, said guide having guide elements spaced from said planar side, a transverse web connecting the sides of each of said intersecting baffles, said transverse web being spaced from the end of said intersecting baffle, guide means on said web complementary to said guide on said parallel baffles, and a latch mounted on each of said intersecting baffles for preventing vertical displacement of said intersecting baffles with respect to said parallel baffles, each of said latches comprising an L-shaped member having a vertical leg and a foot extending therefrom resting upon the upper end of the guides on said parallel baffles, each of said latches including an essentially horizontal leg extending over said intersecting baffle, and means for securing said horizontal leg to said intersecting baffle whereby said latch will be held in latching position.

8. The invention as defined in claim 7 wherein said vertical leg is biased to latching position by spring means constrained between said vertical leg and said web.

9. The invention as defined in claim 7 wherein said guide has rail-like elements spaced from the planar surface of said parallel baffle member, and the guide means of said intersecting baffle member has grooved elements engaging with the rail-like elements of said guide.

10. A corner post assembly for use in a module of a suspended ceiling wherein said module comprises a plurality of spaced apart main baffles arranged at right angles to a plurality of spaced apart cross baffles with a main channel assembly secured to each main baffle, and wherein each of said main and cross baffles comprises a pair of spaced apart wall members having a locking element carried between the said wall members at opposite ends thereof; the improvement comprising a bracket suspended from a fixed support adjacent the intersections of said main baffles and said cross baffles, a hollow vertical body coupled to said bracket and to an end of said main channel assembly, pairs of vertically arranged horizontally spaced outwardly extending flanges on each side of said body engaged between the wall members of respective main and cross baffles with each pair of said flanges engaged with their respective wall members beneath said main channel assembly, a swivelable locking element carried by said body between each pair of extending flanges thereof and engaging the locking element carried by the correlative one of each of said baffles, and cooperating locking means carried intermediate the top and bottom ends of said body engaged with the locking element carried by each of said baffles whereby said baffles are suspended from said body.

11. In the assembly claimed in claim 10, means for locking each swivelable locking element into a predetermined position after its engagement with a respective locking element of said baffle.

References Cited
UNITED STATES PATENTS

| | | | |
|---|---|---|---|
| 2,610,707 | 9/1952 | Shannon et al. | 52—488 |
| 2,689,026 | 9/1954 | Zingone | 52—507 |
| 2,725,126 | 11/1955 | Ely | 52—484 X |
| 2,833,199 | 5/1958 | Wakefield | 52—221 X |
| 2,884,512 | 4/1959 | Wakefield | 98—40 X |
| 2,886,859 | 5/1959 | Siering | 52—664 X |
| 2,999,568 | 9/1961 | Ludwig et al. | 52—238 X |
| 3,001,001 | 9/1961 | Bibb | 52—28 X |
| 3,049,197 | 8/1962 | Ludwig | 52—582 |
| 3,094,285 | 6/1963 | Kruger | 240—9 |
| 3,203,150 | 8/1965 | Serneblad | 52—664 |

DAVID J. WILLIAMOWSKY, *Primary Examiner.*

DENNIS L. TAYLOR, REINALDO P. MACHADO, *Examiners.*

HARRISON R. MOSELEY, *Assistant Examiner.*